United States Patent [19]
Linden et al.

[11] 4,103,149
[45] Jul. 25, 1978

[54] ARRANGEMENT FOR THE PERFORMING SEIZURE STATISTICS FOR A DEVICE BELONGING TO A GROUP OF DEVICES

[75] Inventors: Lars Kalle Lindén, Hästveda; Kjell Stellan Persson, Skärholmen, both of Sweden

[73] Assignee: Telefonaktiebolaget L M Ericsson, Stockholm, Sweden

[21] Appl. No.: 782,063

[22] Filed: Mar. 28, 1977

[30] Foreign Application Priority Data

Apr. 13, 1976 [SE] Sweden ............... 7604340

[51] Int. Cl.² .................. G07C 3/10; H04M 15/18
[52] U.S. Cl. .................. 235/92 TE; 235/92 T; 235/92 R; 179/7.1 R
[58] Field of Search ............ 235/92 ST, 92 T, 92 PD, 235/92 TE, 92 CA, 92 DM, 92 SA, 92 QC; 328/104; 179/7.1 R, 8 A

[56] References Cited

U.S. PATENT DOCUMENTS

| | | | |
|---|---|---|---|
| 3,114,894 | 12/1963 | Arneth | 235/92 TE |
| 3,324,242 | 6/1967 | Gattner et al. | 179/7.1 R |
| 3,590,161 | 6/1971 | Jacobs | 179/7.1 R |
| 3,636,259 | 1/1972 | Karras | 179/7.1 R |
| 3,809,869 | 5/1974 | Gebald | 235/92 PD |
| 4,022,978 | 5/1977 | Connell et al. | 179/7.1 R |

*Primary Examiner*—Joseph M. Thesz
*Attorney, Agent, or Firm*—Hane, Roberts, Spiecens & Cohen

[57] ABSTRACT

The invention concerns an arrangement for the supervision of a number of devices belonging to a group of devices in a telecommunication system, concerning seizure statistics, i.e. the ratio between the number of normal seizures and the total number of seizures, which devices, (relays, relay sets, registers etc) alternately are seized and released. Two counters are connected to each of the individual devices, a first counter for the registration of the total number of seizures of the device, and a second counter for the registration of the number of seizures of the device exceeding a certain minimum time. A first quotient between these numbers is periodically established for each individual device. A first adder adds the total number of seizures for each device belonging to the device group. A second adder adds the number of seizures exceeding a certain minimum time for each device in said the group. A second quotient is established between such two numbers concerning the whole device group. In a comparing circuit a comparison is made in turn between said first quotient for the individual devices and said second quotient. An alarm arrangement delivers alarm signals when the difference between these quotients exceeds a certain value.

1 Claim, 1 Drawing Figure

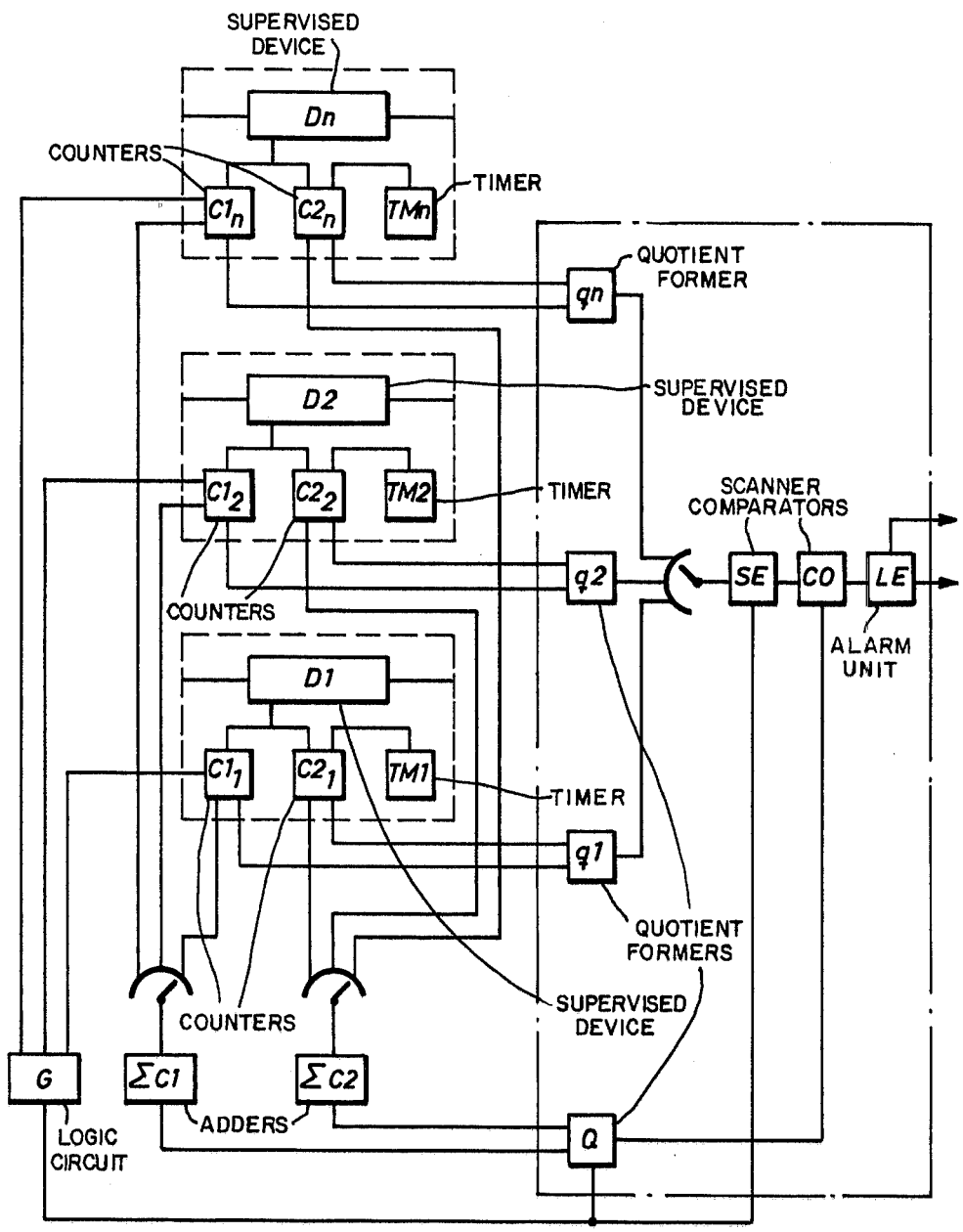

ARRANGEMENT FOR THE PERFORMING SEIZURE STATISTICS FOR A DEVICE BELONGING TO A GROUP OF DEVICES

The invention concerns an arrangement for the supervision of a number of devices belonging to a group of devices in a telecommunication system, concerning seizure statistics, i.e. the ratio between the number of normal seizures and the total number of seizures, which devices (relays, relay sets, registers etc) alternately are seized and released.

For statistical use it is normal to study how different events will influence the operation of different types of devices.

For example in telecommunication systems the behaviour of a number of types of devices can be studied as well as for much larger. Such devices and entities can be relays, relay sets, registers, code senders, code receivers, markers, regional processors etc. In known solutions, for example as shown in the German Offenlegungsschrift No. 2.315.262, the number of seizure conditions of the different devices are counted. Thereafter a further assessment and treatment is necessary. In the German Auslegeschrift No. 1.166.287 a method is described for the supervision of devices by producing a quotient between the sums of two different events of the device. This method also requires considerable subsequent processing.

The invention which achieves a more effective supervision of the seizure statistics of different devices than the known arrangements is characterized by the accompanying claim.

The invention is described more in detail by making with reference to the accompanying drawing which is a block diagram of the presently preferred embodiment of the invention.

The embodiment concerns supervision of devices for telephony in a telecommunication system where faults in the devices normally result in a faulty behaviour corresponding to wrong behaviour of the connected subscriber.

The devices which are to be supervised bear the references D1-Dn and represent individual devices belonging to a group of devices. Such a group of devices can, for example, be a subscriber switch unit and contain about 150-200 devices. Each device D1-Dn is provided with a counter $C1_1$-$C1_n$ counting the total number of seizures of the device. To each device D1-Dn is also connected a counter $C2_1$-$C2_n$ which counts the number of seizures exceeding a certain minimum time $t$. To each device D1-Dn is further connected an equipment TM1-TMn for measuring the holding time which elapses from that B-answer has been received until said minimum time $t$ has been obtained. At each seizure of greater duration than the time $t$ seconds the counter $C2_1$-$C2_n$ unit increments. At release, A or B-replacement, the time measuring is stopped. A call (seizure) of shorter duration than $t$ seconds is not counted by the counters $C2_1$-$C2_n$. The seizure condition counters $C1_1$-$C1_n$, however, record all the seizure conditions of the devices, even those that have less than the duration $t$ seconds.

The arrangement also includes two adders C1 and C2. The adder C1 adds all the seizure conditions counted by the counters $C1_1$-$C1_n$ in the whole group of devices. The adder C2 adds all the seizure conditions counted by the counters $C2_1$-$C2_n$ in the whole group of devices.

The blocks marked $q1$-$qn$ represent quotient formers for the periodic calculation of the quotient between the counters C2 and C1 for each individual device. The block marked Q represents a quotient counter for periodic calculation of the quotient between the sums of the number of seizures counted by all the counters C2 and C1, respectively, in the whole group of devices, i.e. the quotient between the values in the adders C2 and C1, where an average value for the quotient of the whole group of devices will be obtained.

In a comparator CO a comparison is made between the periodically updated quotient Q and in turn the quotients $q1$-$qn$ for the individual devices. A scanning arrangement SE has the task to start the comparison when receiving a signal from a logical circuit G and connects in turn the quotients from units $q1$-$qn$ to the comparator CO where a comparison is carried out with the output signal from the quotient counter Q which is also connected to the comparator CO. When the difference between the quotients $q$ and Q exceeds a certain value $k$ a signal will effect an alarm unit LE which in turn, depending on the size of the difference, will unit an alarm signal or an alarm signal and a blocking signal to the faulty device.

A supervision period for a device corresponds by way of example to 256 seizure conditions counted by the counter C1 belonging to the individual device. When the counter C1 of the device reaches the maximum value, a control signal is sent to the counter C2 of the device. The values of the counters C1 and C2 are sent to the quotient counter $q$ which is also connected to the device for the calculation of the quotient between the counters. A logic circuit G has one input connected to each of the counters C1 of the individual devices. When one of said counters has counted 256 seizure conditions a signal is sent from the counter to the corresponding input of the circuit G. Upon receiving a signal on some of the inputs the circuit G will produce an output signal which effects the scanning arrangement SE connected to said output and the earlier mentioned comparison will start.

Each counter C1 belonging to an individual device produces during a supervision period signals for periodically updating the adder C1. Each counter C2 belonging to the individual devices produces during a supervision period signals for periodically updating the adder C2.

The quotient Q between the sums of the adders is periodically updated at the same rate as the contents in the adders C1 and C2. From the output of circuit G a signal is fed to the quotient counter Q which counter is activated and sends the result to the comparator CO. After each assessment, the counters C1 and C1 in the device in question are reset to zero and a new supervision period starts. This example shows how the supervision is controlled by a number of seizure conditions in the seizure counters $C1_1$-$C1_n$.

Instead of utilizing the counter results for determining the time for the comparison it is of course possible to carry out the comparisons at certain determined time intervals. The method does allow the discovering of faulty devices within an acceptable time by the supervision of real traffic.

By periodically updating the quotient of the group of devices a relative alarm limit is provided during the comparison as opposed to the adjustable alarm limit in fixed steps which normally is used in known arrangements. The advantage of a relative alarm limit is that faults will be discovered with the same probability irrespective of the noise of the network. Thus, this method for assessment will decrease the probability of false alarms caused by noice in the network.

By using an arrangement according to the invention the following types of faults can be discovered in a supervised device, for example, cord line relay sets.

— voltage drop out
— break in $a$ or $b$-wire
— short circuit in $a$ or $b$-wire
— + on $a$ or $b$-wire
— fault in line scanning circuits
— fault in dialling tone relay
— fault in relay for through connection
— fault in ringing trip detector
— fault in ringing relay
— no ringing signal RG or dialling tone SU
— transmission faults obvious to the subscriber.

The method can of course also be utilized for the supervision of only the seizure frequency of the devices, in such case only the counters $C1_1$–$C1_n$ and the adder C1 being used.

We claim:

1. Arrangement for the statistical supervision of a number of devices belonging to a group of devices in a telecommunication system with respect to seizure conditions, i.e. the ratio between the number of normal seizures and the total number of seizures, which devices being alternately seized and released, said arrangement comprising two counters associated with each individual device, a first counter for counting the total number of seizures of the device, a second counter for counting the number of seizures exceeding a certain minimum time, means associated with each individual device for measuring said minimum time, dividing means connected to outputs of said counter for the periodic calculation of the ratio between the numbers accumulated by said second and said first counter, first adding means for adding of the numbers obtained from all said first counter belonging to the group of devices, second adding means for adding of the values obtained from all said second counters belonging to the group of devices, dividing means connected to outputs of said adding means for periodically calculating the quotient between the sums obtained from said second counters and said first counters, a gate circuit means for the periodical transfer of the quotient belonging to an individual device as well as the quotient belonging to the whole group of devices a comparison means connected to said gate circuit means, said comparison means including means for comparing the quotient between the number of seizures exceeding a certain time and the total number of seizures for each individual device with the corresponding quotient for the whole group of devices, and alarm means connected to said comparison means for producing alarm signals for certain differences between the values of said quotients.

* * * * *